(12) United States Patent
Waheed et al.

(10) Patent No.: US 10,921,439 B2
(45) Date of Patent: Feb. 16, 2021

(54) DISTANCE ESTIMATION BASED ON NARROW-BAND WIRELESS TIME-OF-FLIGHT

(71) Applicant: NXP USA, INC., Austin, TX (US)

(72) Inventors: Khurram Waheed, Austin, TX (US); Carlos Alberto Neri Castellanos, Zapopan (MX)

(73) Assignee: NXP USA, Inc., Austin, TX (US)

( * ) Notice: Subject to any disclaimer, the term of this patent is extended or adjusted under 35 U.S.C. 154(b) by 209 days.

(21) Appl. No.: 16/013,296

(22) Filed: Jun. 20, 2018

(65) Prior Publication Data

US 2019/0391252 A1 Dec. 26, 2019

(51) Int. Cl.
*G01S 13/76* (2006.01)
*G01S 7/34* (2006.01)

(52) U.S. Cl.
CPC .............. *G01S 13/767* (2013.01); *G01S 7/34* (2013.01)

(58) Field of Classification Search
CPC . G01S 5/02; G01S 7/282; G01S 13/76; G01S 13/767; G01S 7/34; G01S 13/765; G01S 5/14; G01S 5/0205; G01S 5/021; H04W 4/02
USPC .......................................................... 342/51
See application file for complete search history.

(56) References Cited

U.S. PATENT DOCUMENTS

| | | | | |
|---|---|---|---|---|
| 7,058,020 B2* | 6/2006 | Tavana | .................. | H04J 3/0697 370/252 |
| 7,450,069 B2* | 11/2008 | Heidari-Bateni | ..... | G01S 13/767 342/387 |
| 7,940,693 B2* | 5/2011 | Tien | ........................ | H04L 67/18 370/253 |
| 7,962,150 B2* | 6/2011 | Hertzog | ................ | G01S 5/0221 455/456.1 |
| 8,233,432 B2* | 7/2012 | Northcutt | .............. | H04L 45/122 370/328 |
| 8,279,898 B2* | 10/2012 | Oh | ........................ | G01S 13/767 370/508 |
| 8,289,963 B2* | 10/2012 | Barcelo Arroyo | .... | H04W 64/00 370/389 |
| 9,319,054 B2* | 4/2016 | Webb, III | ................ | H03L 7/16 |
| 9,504,003 B2* | 11/2016 | George | ................ | H04W 64/00 |
| 9,606,219 B2* | 3/2017 | Murdock | .................. | G01S 5/14 |

(Continued)

FOREIGN PATENT DOCUMENTS

| | | |
|---|---|---|
| WO | 02/063327 A2 | 8/2002 |
| WO | WO-02063327 A2 * | 8/2002 ............. G01S 13/46 |

*Primary Examiner* — Vladimir Magloire
*Assistant Examiner* — Alexander L. Syrkin

(57) ABSTRACT

A wireless ranging system generates, at a first device, a first plurality of counts, each of the first plurality of counts indicative of a transmit time of a corresponding packet, and further generates a second plurality of counts, each of the second plurality of counts indicative of a receive time of a corresponding packet. In response to a number of samples of the first plurality of counts exceeding a threshold, the system generates a plurality of timestamps based on the first plurality of counts and the second plurality of counts and generates a plurality of time-of-flight values based on the plurality of timestamps. Based on a combination of the plurality of the time-of-flight values, the wireless ranging system generates an effective time-of-flight value and identifies a distance between the first device and as second device based on the effective time-of-flight value.

20 Claims, 7 Drawing Sheets

(56) References Cited

U.S. PATENT DOCUMENTS

| | | | |
|---|---|---|---|
| 9,766,322 B2* | 9/2017 | Taylor, Jr. | G01S 5/0226 |
| 2012/0106380 A1* | 5/2012 | Vaidyanathan | G01S 5/14 |
| | | | 370/252 |
| 2013/0143594 A1* | 6/2013 | Ghabra | H04L 63/1416 |
| | | | 455/456.1 |
| 2014/0187259 A1* | 7/2014 | Kakani | G01S 11/02 |
| | | | 455/456.1 |
| 2015/0212193 A1* | 7/2015 | George | H04W 4/023 |
| | | | 370/252 |
| 2016/0033260 A1* | 2/2016 | Valente | G01B 11/14 |
| | | | 702/150 |
| 2016/0174040 A1* | 6/2016 | Roberts | G01S 5/08 |
| | | | 455/456.1 |
| 2017/0257885 A1* | 9/2017 | Zhang | H04W 74/008 |
| 2017/0322309 A1* | 11/2017 | Godbaz | G01S 17/08 |
| 2017/0353940 A1* | 12/2017 | Seth | H04L 43/0864 |

* cited by examiner

DISTANCE ESTIMATION BASED ON NARROW-BAND WIRELESS TIME-OF-FLIGHT

BACKGROUND

Field of the Disclosure

The present disclosure relates generally to wireless communications and more particularly to wireless ranging and localization.

Description of the Related Art

Wireless ranging and localization (referred to herein as wireless ranging for simplicity) is used in a variety of applications, including car access systems, asset tracking systems, proximity sensors, gaming applications, security applications, and others. To support wireless ranging between two devices, a system employs a radio at each device, with one device communicating an initial packet to the other device, and with the other device responding with a return packet. Based on the time at which the initial packet was transmitted and the time at which the return packet is received, the transmitting device can calculate a time-of-flight (ToF) of the packets and, based on the ToF, determine a distance (range) between the two devices. The determined distance can be employed for a variety of functions, such as taking a specified action (e.g., granting secure access to a location or device, such as a car) when the distance is below a threshold.

Conventional wireless ranging systems suffer from several limitations. For example, to support sufficient resolution of the determined distance, some conventional wireless ranging systems employ ultra-wideband (UWB) radios to communicate the test and return packets. However, such UWB radios consume a relatively large amount of power and are therefore not suitable for many applications, such as devices that use battery power. Furthermore, UWB typically have a limited range. Other conventional wireless ranging systems achieve higher distance resolution by employing a large number of radios, antennas, or wireless nodes. Conventional wireless ranging systems therefore consume a relatively high amount of power or are too complex or too insecure to be used in a variety of applications.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate techniques for performing wireless ranging according to a "multi-stage" wireless ranging protocol, whereby the protocol includes at least three stages: a data collection stage, a processing stage, and a reporting stage. During the data collection stage, the wireless ranging system collects multiple count samples based on the timing of communication of multiple test and return packets between a measuring device and a reflector device. During the processing stage, the measuring device uses the multiple count samples to calculate a plurality of ToF samples. In addition, during the processing stage, the measuring device can prune the ToF samples based on a statistical profile indicating the quality of each ToF sample to generate a pruned set of ToF samples, and combine (e.g., average) the pruned set of ToF samples to generate an effective ToF value. During the reporting stage, the measuring device identifies, based on the effective ToF value the distance between the measuring device and the reflector device. By employing the multi-stage protocol, the wireless ranging system can support several features, including enhanced distance resolution and accuracy while employing narrow-band radios, improved security (e.g., via frequency hopping during the data collection stage), low power consumption, and relatively simple implementation.

Figure 1:
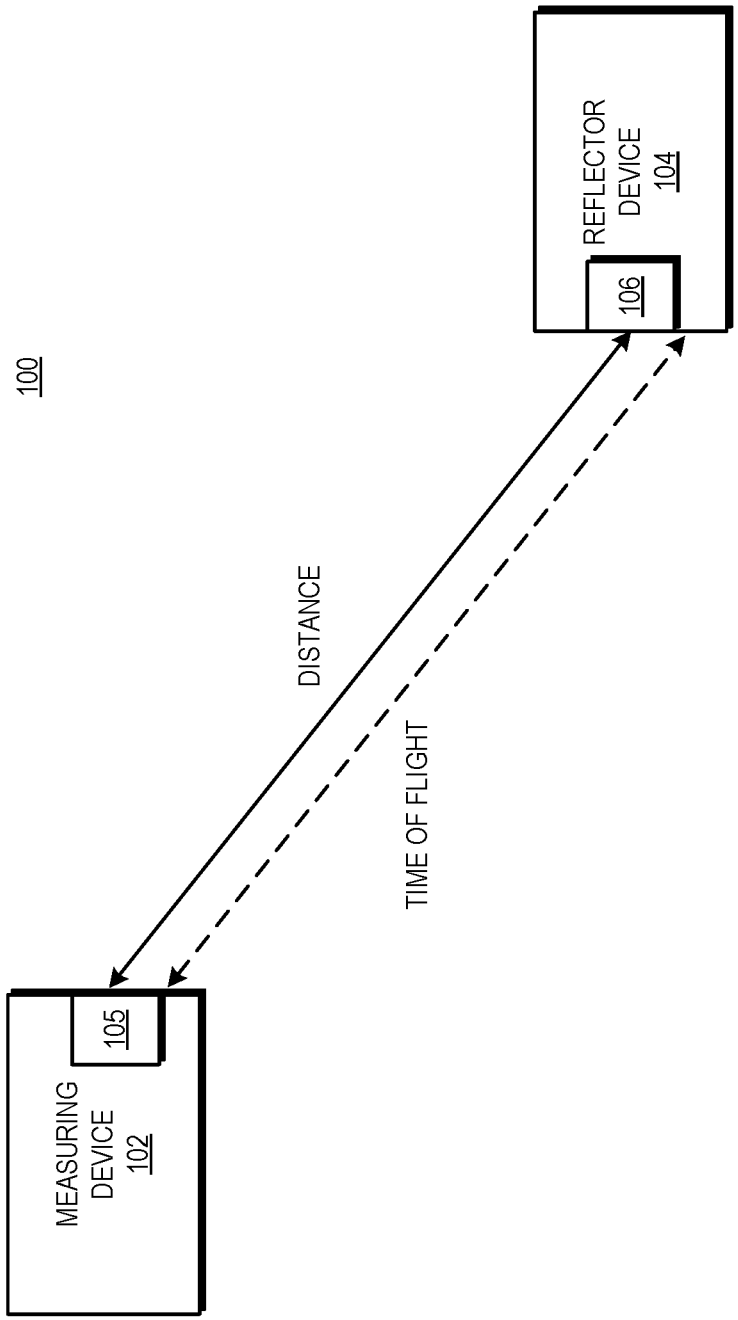
FIG. 1 is a block diagram of a wireless ranging system that employs a multi-stage wireless ranging protocol in accordance with at least one embodiment.

FIG. 1 illustrates a wireless ranging system 100 that includes a measuring device 102 and a reflector device 104. As described further herein, the wireless ranging system 100 is generally configured to determine a distance between the devices 102 and 104 by employing a multi-stage wireless ranging protocol. Accordingly, the wireless ranging system can be employed in a variety of applications and the devices 102 and 104 can be any of a variety of devices. For example, in at least one embodiment the measuring device 102 is an automobile, the reflector device 104 is a fob, and the distance identified by the wireless ranging system 100 is used to determine whether a user is in close proximity to the automobile to, for example, automatically unlock an automobile door. In another embodiment, the measuring device 102 is a sensor device located in a warehouse, the reflector device 104 is a sensor affixed to an asset to be tracked, and the distance identified by the wireless ranging system 100 is used to determine whether the asset has been removed from a warehouse shelf or other storage location. Thus, the wireless ranging system 100 can be employed in any of several applications to track the distance between two devices.

To support wireless ranging, the measuring device 102 and the reflector device 104 each include a wireless radio module, designated radio module 105 and radio module 106 respectively. The radio modules 105 and 106 are generally configured to transmit and receive packets according to one or more specified wireless protocols, such as BLUETOOTH LE (BLE), Institute of Electrical and Electronics Engineers (IEEE) standard 802.15.4, Gaussian frequency-shift keying (GFSK), Frequency shift keying (FSK) and Orthogonal QPSK protocols, and the like, or a custom wireless protocol. In at least one embodiment, in addition to the wireless ranging functions described further herein, the radio modules 105 and 106 are used to communicate other data between the devices 102 and 104 according to the corresponding wireless protocol. Such data can include, for example, device identification data, security data, multimedia data, and the like.

To implement wireless ranging, the measuring device 102 and the reflector device 104 together implement a multi-stage wireless ranging protocol including at least three stages: a data collection stage, a processing stage, and a reporting stage. During the data collection stage, the measuring device 102 employs the wireless radio module 105 to transmit specified packets, referred to herein as ranging packets, to the reflector device 104. In response to receiving a ranging packet, the reflector device 104 employs the wireless radio module 106 to transmit a response packet. In addition, for each ranging packet and response packet, the measuring device 102 and the reflector device 104 maintain timing information that is employed during the processing and reporting stages to identify the distance between the devices 102 and 104.

To illustrate, and as described further below, the measuring device 102 and the reflector device 104 each include a corresponding free running counter controlled by a specified clock signal. Each time the wireless radio module 105 transmits a ranging packet or receives a response packet, the measuring device 102 stores a corresponding value (referred to herein as a count) of the respective counter. Further, each time the wireless radio module 106 receives a ranging packet or transmits a response packet, the reflector device 104 stores a corresponding count of the respective counter. The reflector device 104 communicates, via the response packets, the receive and transmit counts to the measuring device 102. Thus, during the data collection stage, the measuring device 102 records a plurality of counts corresponding to a plurality of ranging packet transmit times, a plurality of ranging packet receipt times, a plurality of response packets transmit times, and a plurality of response packet receive times. By collecting multiple count samples in this way, the measuring device can generate multiple ToF samples as described further below, improving ranging resolution and accuracy while using narrow-band radio signals.

During the processing stage, the measuring device 102 processes the count samples to 1) determine one or more statistical profiles for the count samples 2) employ the one or more statistical profiles to prune low-quality count samples from the stored counts; 3) employ the pruned count samples to generate a plurality of ToF samples; and 4) combine (e.g., average) the pruned ToF samples to generate an effective ToF value. Each of these aspects is described further below. During the reporting stage, the measuring device 102 employs the effective ToF value to generate a distance (also referred to as a range) between the measuring device 102 and the reflector device 104 by, for example, multiplying the effective ToF value by a specified value corresponding to the transmission speed of the ranging and response packets (i.e., the speed of light).

By employing the above-described multi-stage ranging protocol, the wireless ranging system supports several improvements in wireless ranging, including improved resolution and precision for narrow-band wireless ranging, improved measurement time and processing efficiency, and improved security. For example, with respect to resolution and precision of wireless ranging, in at least one embodiment the radio modules 105 and 106 each employ a relatively precise time-stamp clock to generate the count samples, wherein the time-stamp clock is separate from and has a finer time resolution than a radio clock used by the radio link-layers and protocols to communicate data packets. To support improved precision, each time-stamp can be generated in response to a trigger that corresponds to a specific transmit or receive event, such as transmission of a specified bit, identifying a match of a packet address, and the like. Further, in at least one embodiment, the time-stamp clock and the radio clock are derived from a common reference clock to ameliorate drift between the two clocks.

In at least one embodiment, the resolution and precision of the wireless ranging is enhanced by employing an initial calibration measurement. During the calibration measurement, the measuring device 102 and the reflector device 104 are placed at a specified distance and wireless ranging is initiated. The resulting effective ToF will thereby indicate systematic packet propagation delays at the measuring device 102 and the reflector device 104. During the processing stage of subsequent wireless ranging measurements (after the calibration stage) the measuring device 102 can eliminate the systematic propagation delays from the ToF measurements by adjusting each ToF measurement by a calibration offset corresponding to the systematic packet propagation delays, thereby improving ranging resolution and precision. In at least one embodiment, the measuring device 102 can adjust for other delay variations during the processing stage, such as those resulting from automatic gain control (AGC) settings at one or more of the radio modules 105 and 106.

The data collection and processing stages can also support enhanced resolution and precision by enabling the reduction or elimination of low-quality ToF samples. For example, in at least one embodiment, during the processing stage the measuring device 102 employs one or more statistical data measures to determine the reliability of each ToF sample and eliminates those ToF samples identified as unreliable. Examples of such statistical measures include one or more of a mean, median, mode, minimum, maximum, centroid, medoid, variance, standard deviation, and the like. The measuring device 102 can also compute a quality metric for each ToF sample based on statistical and other constraints and eliminate those ToF samples having a quality metric below a threshold. In at least one embodiment, the quality metric is a statistical measurement derived from each ToF measurement that indicates the deviation of the ToF measurement from the selected statistical measure (e.g., the mean, the median, the mode, and the like). The measuring device 102 thus ensures that only reliable and high-quality ToF samples are employed to calculate the distance between the devices 102 and 104, thereby improving distance resolution and precision. Moreover, by employing a multi-stage protocol, the measurement time for multiple ToF samples is reduced, and the processing tasks for the data collection and processing stages can be divided among multiple processing units (e.g., multiple processors or processor cores), improving ranging efficiency and speed.

With respect to security, the multi-stage ranging protocol can support several security features. For example, in at least one embodiment the radio modules 105 and 106 employ frequency-hopping (e.g., pseudo-random frequency hopping) during the data collection stage, whereby the radio modules 105 and 106 change the frequency at which the range packets and response packets are communicated according to a specified frequency pattern. In at least one embodiment the frequency pattern is a pseudo-random pattern that is communicated between the radio modules 105 and 106 prior to or during the data collection stage. In at least one embodiment, ranging security is supported by the radio modules 105 and 106 encrypting the ranging and response packets, respectively.

Figure 2:
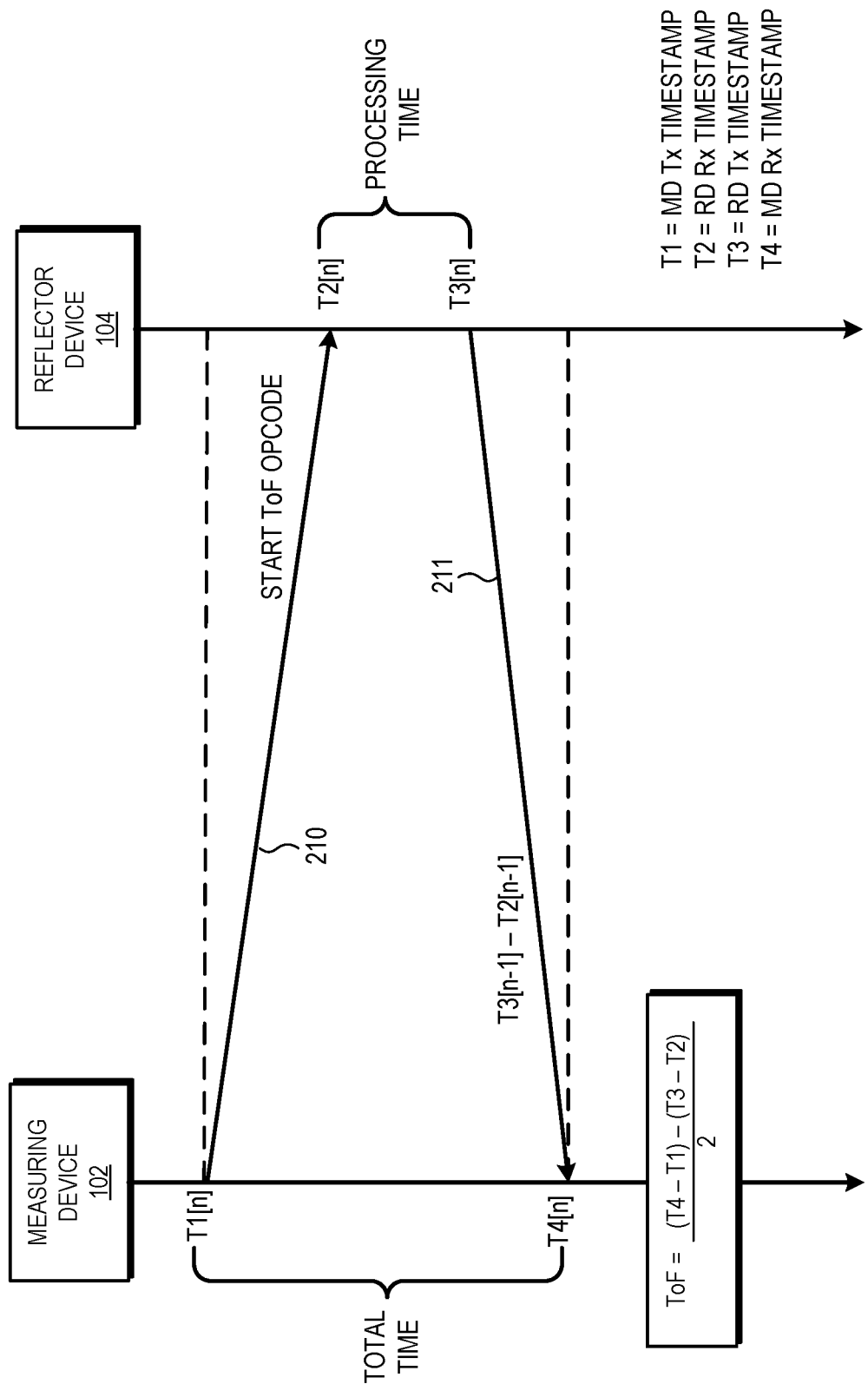
FIG. 2 is a diagram illustrating an example of a portion of a data collection stage of the multi-stage wireless ranging protocol at the wireless ranging system of FIG. 1 in accordance with at least one embodiment.

FIG. 2 illustrates a portion of a data collection stage of the multi-stage ranging protocol implemented by the wireless ranging system 100 of FIG. 1 in accordance with at least one embodiment. The depicted example illustrates the transmission of an Nth ranging packet 210 and the resulting transmission of an Nth response packet 211, where N is an integer. The measuring device records a count, designated T1[n], in response to initiating transmission of the ranging packet 210. In response to receiving the ranging packet 210, the reflector device 104 records a count designated T2[n] and generates the response packet 211. As illustrated, generating the response packet 211 takes an amount of time designated as "processing time" that is to be eliminated in order to get an accurate reading of the distance between the measuring device 102 and the reflector device 104. The processing time for the Nth response packet can be expressed by the following formula:

$$T3[n] - T2[n]$$

In response to initiating transmission of the response packet 211 the reflector device 104 stores a count designated T3[n]. In the example of FIG. 2, the reflector device 104 generates the response packet 211 to include a data payload indicating the processing time for the previous response packet (i.e. the n−1 response packet). By including the processing time for the n−1 response packet in the nth response packet, rather than the processing time for the nth packet, the reflector device 104 can more quickly generate response packets, thereby improving overall ranging efficiency.

In response to receiving the response packet 211, the measuring device 102 records a count designated T4[n]. During the processing stage, the measuring device 102 can generate the ToF value for each ranging-response packet pair according to the following formula:

$$ToF = \frac{(T4 - T1) - (T3 - T2)}{2}$$

Figure 3:
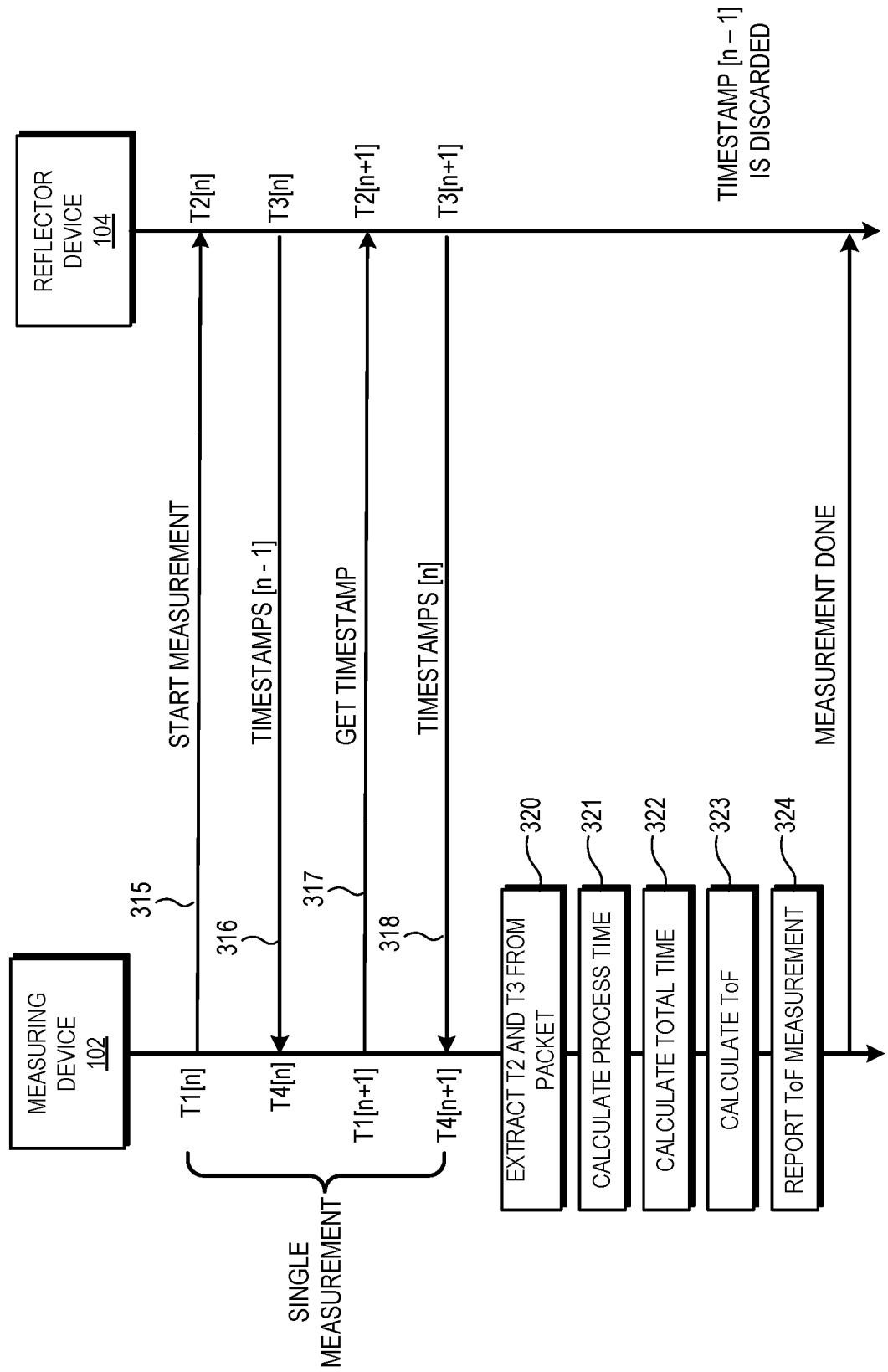
FIG. 3 is a diagram illustrating an example of another portion of a data collection stage of the multi-stage wireless ranging protocol at the wireless ranging system of FIG. 1 in accordance with at least one embodiment.

FIG. 3 illustrates another example of a portion of a data collection stage and processing stage of the multi-stage ranging protocol implemented by the wireless ranging system 100 of FIG. 1 in accordance with at least one embodiment. In the depicted example, the measuring device 102 initiates the Nth ToF measurement by transmitting a ranging packet 315 and storing a corresponding count T1[n]. In response to receiving the ranging packet 315 the reflector device 104 stores a count T2[n] and generates a response packet 316 including the timestamps (counts) T2[n−1] and T3[n−1] for the previous (n−1) ranging packet and response packet. The reflector device 104 transmits the response packet 316 and stores a corresponding count T3[n]. In response to receiving the response packet 316 the measuring device 102 stores a count T4[n].

Subsequently, the measuring device 102 initiates the N+1 ToF measurement by transmitting a ranging packet 317 and storing a corresponding count T1[n+1]. In response to receiving the ranging packet 317 the reflector device 104 stores a count T2[n+1] and generates a response packet 318 including the timestamps (counts) T2[n] and T3[n−1] for the previous ranging packet 315 and response packet 316. The reflector device 104 transmits the response packet 318 and stores a corresponding count T3[n+1]. In response to receiving the response packet 318 the measuring device 102 stores a count T4[n+1].

In addition, the measuring device 102 extracts T2[n] and T3[n] at block 320. At block 321 the measuring device 102 calculates the process time for generating the response packet 316 by subtracting T2[n] from T3[n]. At block 322 the measuring device 102 calculates the total time between transmission of the ranging packet 315 and receipt of the responsive packet 316 by subtracting T1[n] from T4[n]. At block 323 the measuring device 102 calculates the Nth ToF value according to the formula set forth above. At block 324 the measuring device 102 reports the Nth ToF value by, for example, storing the value at a memory for subsequent processing. The measuring device 102 then signals the reflector device 104 that it can discard the n−1 timestamps (counts), allowing the reflector device 104 to conserve memory resources.

Figure 4:
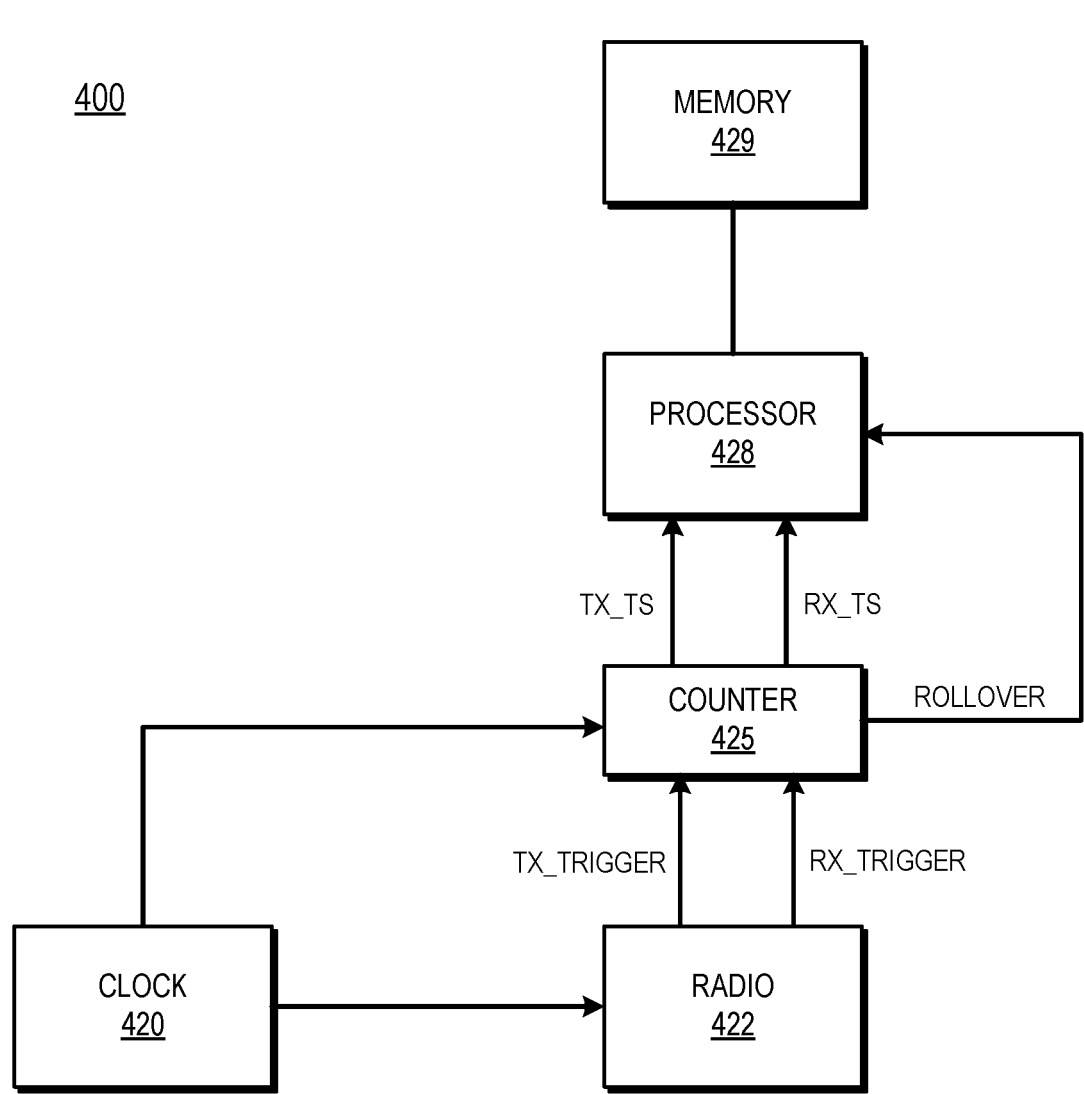
FIG. 4 is a block diagram of a portion of a wireless radio module of the wireless ranging system of FIG. 1 in accordance with at least one embodiment.

FIG. 4 is a block diagram of a wireless radio module 400 in accordance with at least one embodiment. For purposes of description, it is assumed that the wireless radio module 400 corresponds to the radio module 105 of FIG. 1. However, it will be appreciated that the radio module 106 of FIG. 1 can employ a similar configuration as the illustrated radio module 400.

In the depicted example, the radio module 400 includes a clock 420, a radio 422, a counter 425, a processor 428, and a memory 429. The clock 420 is generally configured to provide clock signals to synchronize operations of the radio 422 and the counter 425. In at least one embodiment, the clock 420 is an adjustable clock source, whereby a control module (not shown) can change the frequency of the clock signal provided by the clock 420. The clock 420 can thus be adjusted to synchronize with the clock of another radio, such as the radio module 106 of the reflector device 104. Further, the clock 420 can be adjusted to support frequency hopping during a timestamp data collection stage as described further herein.

The radio 422 is a wireless radio generally configured to provide at least a physical (PHY) and link layers for wireless communication according to one or more wireless protocols such as BLE, IEEE 802.15.4, and GFSK protocols. The radio 422 is further configured to provide control signaling to the counter 425 in response to transmitting a ranging packet or receiving a response packet in order to initiate storage of a corresponding timestamp (count). In the depicted example, the control signaling includes two signals, designated TX_TRIGGER and RX_TRIGGER, each of which has a relatively fixed relationship with a defined transmit or receive event at the radio 422. For example, in at least one embodiment the radio 422 is configured to assert the TX_TRIGGER signal in response to transmitting the first bit of a packet, and to assert the RX_TRIGGER signal in response to matching a packet address of a received packet to an address associated with the radio 422. As described further below, by asserting the TX_TRIGGER and RX_TRIGGER signals based on defined events, the radio 422 supports relatively precise timestamps for transmitted and received packets.

The counter 425 is a free running counter generally configured to adjust a stored count in response to the clock signal provided by the clock 420. The counter 425 is configured to initialize the stored count to an initial value, to adjust the stored count based on the clock signal, and in response to the stored count reaching an overflow value reset the stored count to the initial value. In addition, the counter 425 is configured to provide a count to the processor 428 in response to the control signaling from the radio 422, such as in response to assertion of the TX_TRIGGER signal or assertion of the RX_TRIGGER signal. In the illustrated embodiment, the counter 425 is configured to provide a count designated TX_TS in response to assertion of the TX_TRIGGER signal, and to provide a count designated RX_TS in response to assertion of the RX_TRIGGER signal. As noted above, the TX_TRIGGER and RX_TRIGGER have relatively fixed relationships to defined transmit and receive events, respectively, at the radio 422. Accordingly, the TX_TS and RX_TS counts generated by the counter 425 are relatively precise timestamps for the corresponding transmit and receive events.

In addition, in the illustrated embodiment the counter 425 provides a rollover signal (designated ROLLOVER in the Figure) to the processor 428 that is asserted in response to the counter 425 rolling over (i.e., reaching a specified rollover value and returning to an initial state). In at least one embodiment the processor 428 keeps a count of the rollovers at the counter 425 and employs the rollover count to extract timestamps from the raw counts provided by the counter 425. For example, in at least one embodiment the processor 428 can extract a timestamp by multiplying the number of rollovers with a timing factor corresponding to a known amount of time that corresponds to a rollover of the counter 425 and adding the product of the multiplication to the raw count provided by the counter 425.

The memory 429 includes one or more memory modules generally configured to store data on behalf of the processor 428. Accordingly, the memory 429 can be volatile memory such as random-access memory (RAM), non-volatile memory such as flash memory, or a combination thereof. The processor 428 is a processing device (such as a general purpose or application specific processor configured to implement one or more portions of the multi-stage ranging protocol described herein. For example, in at least one embodiment the processor 428 is configured to work with the memory 429 to collect timestamp data during a data collection stage of the multi-stage ranging protocol.

To illustrate, in operation the processor 428 initiates the data collection stage by providing a signal (not shown) to the radio 422. In response, the radio 422 forms and transmits a threshold number of ranging packets and receives a corresponding number of response packets as described above. In response to transmitting a ranging packet the radio 422 provides a control signal to the counter 425. In response, the counter 425 provides a count to the processor 428, which stores the count at the memory 429 as, for example, the T1[n] timestamp. Similarly, in response to receiving a response packet the radio 422 provides a control signal to the counter 425. In response, the counter 425 provides a count to the processor 428, which stores the count at the memory 429 as, for example, the T4[n] timestamp. Thus, the processor 428 collects and stores the timestamps for the ranging packets and the response packets during the data collection stage. In addition, in at least one embodiment the processor 428 performs one or more functions of the processing and reporting stages described herein.

Figure 5:
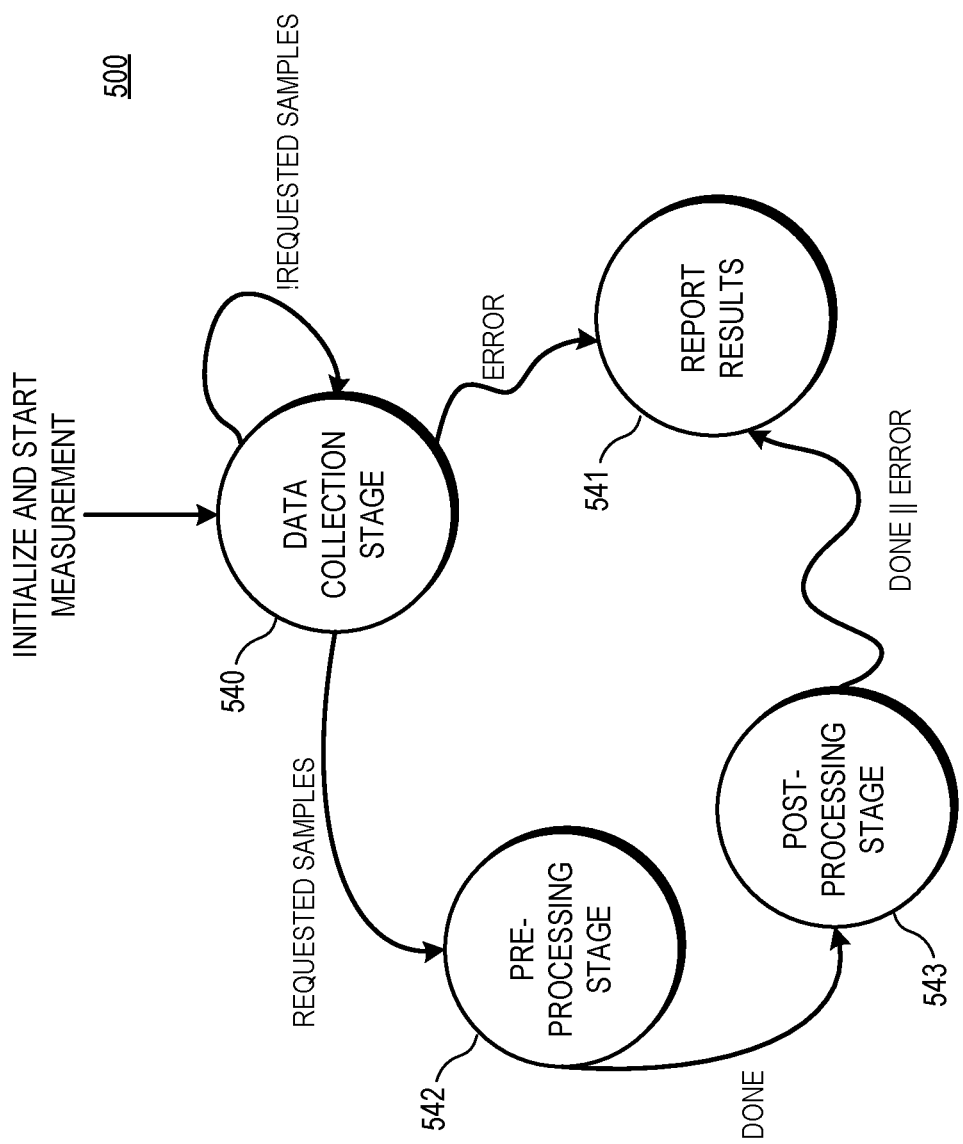
FIG. 5 is a block diagram illustrating the relationship of different stages of the multi-stage wireless protocol of the wireless ranging system of FIG. 1 in accordance with at least one embodiment.

FIG. 5 illustrates a state diagram 500 depicting the different stages of the multi-stage ranging protocol implemented at the wireless ranging system 100 of FIG. 1 in accordance with at least one embodiment. In the illustrated example, in response to initiating a distance measurement, the wireless ranging system 100 enters a state 540 corresponding to the data collection stage. During the data collection stage, the measuring device 102 sends ranging packets, receives corresponding response packets, and collects and stores timestamps (counts) for the ranging packets and response packets as described above until a threshold number of requested samples has been reached, wherein each sample corresponds to a set of ranging and receive packet timestamps. Thus, using the example described above, in at least one embodiment one sample corresponds to the T1[n], T2[n], T3[n], and T4[n] timestamps. In response to an error in collecting the threshold number of samples, the wireless ranging system 100 transitions directly to a state 541, corresponding to the reporting stage, and reports the error.

In response to the threshold number of samples being collected during the data collection stage, the state of the wireless ranging system 100 transitions to a state 542, corresponding to the pre-processing stage of the multi-stage protocol. In at least one embodiment, the pre-processing stage the measuring device 102 performs pre-processing operations based on the timestamp data collected during the data collection stage. Examples of pre-processing operations include extraction of timestamp information from the stored raw count values, calculation of processing time and total time values for each set of timestamps, compensation of the timestamp values based on identified offsets such as AGC group delay offsets and offsets resulting from artifacts, and calculation of a ToF value for each set of timestamps.

During the post-processing stage, the measuring device 102 performs post-processing operations based on the timestamp data collected during the data collection stage. Examples of post-processing operations include extracting data statistics from the set of ToF values calculated during the pre-processing stage, computing quality metrics for each ToF value, pruning of the ToF values based on the quality metrics, and calculation of an effective ToF value based on the ToF values.

In response to calculating the effective ToF value, or in response to an error, the wireless ranging system 100 transitions from the state 543 to the state 541 corresponding to the reporting stage. During the reporting stage, if an error was detected during the state 540 or the state 543, the wireless ranging system reports the error, such as by recording the error in an error log for subsequent access by a user or analysis tool. If no error was detected, during the reporting stage the measuring device 102 adjusts the effective ToF value based on any calibration offset identified during the initial calibration process, and then determines the distance between the measuring device 102 and the reflector device 104 based on the adjusted ToF value. The measuring device 102 then reports the distance, such as by providing the distance to software executing at the measuring device 102. The executing software can execute one or more specified actions based on the reported distance, such as unlocking a car door, identifying the location of a tracked asset, and the like.

Figure 6:
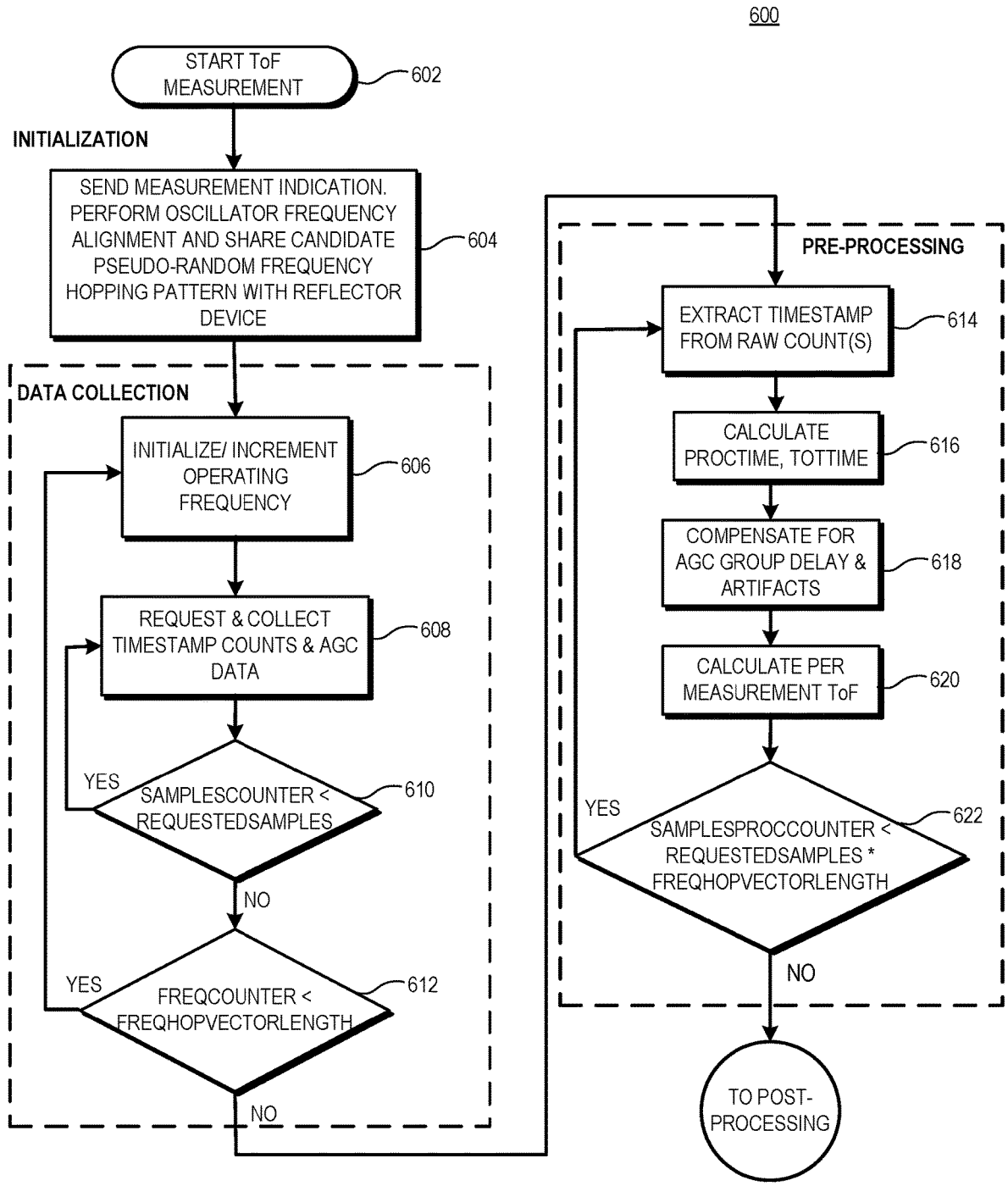
FIG. 6 is a flow diagram of a method of executing a data collection stage and a preprocessing stage of a multi-stage wireless ranging protocol in accordance with at least one embodiment.
Figure 7:
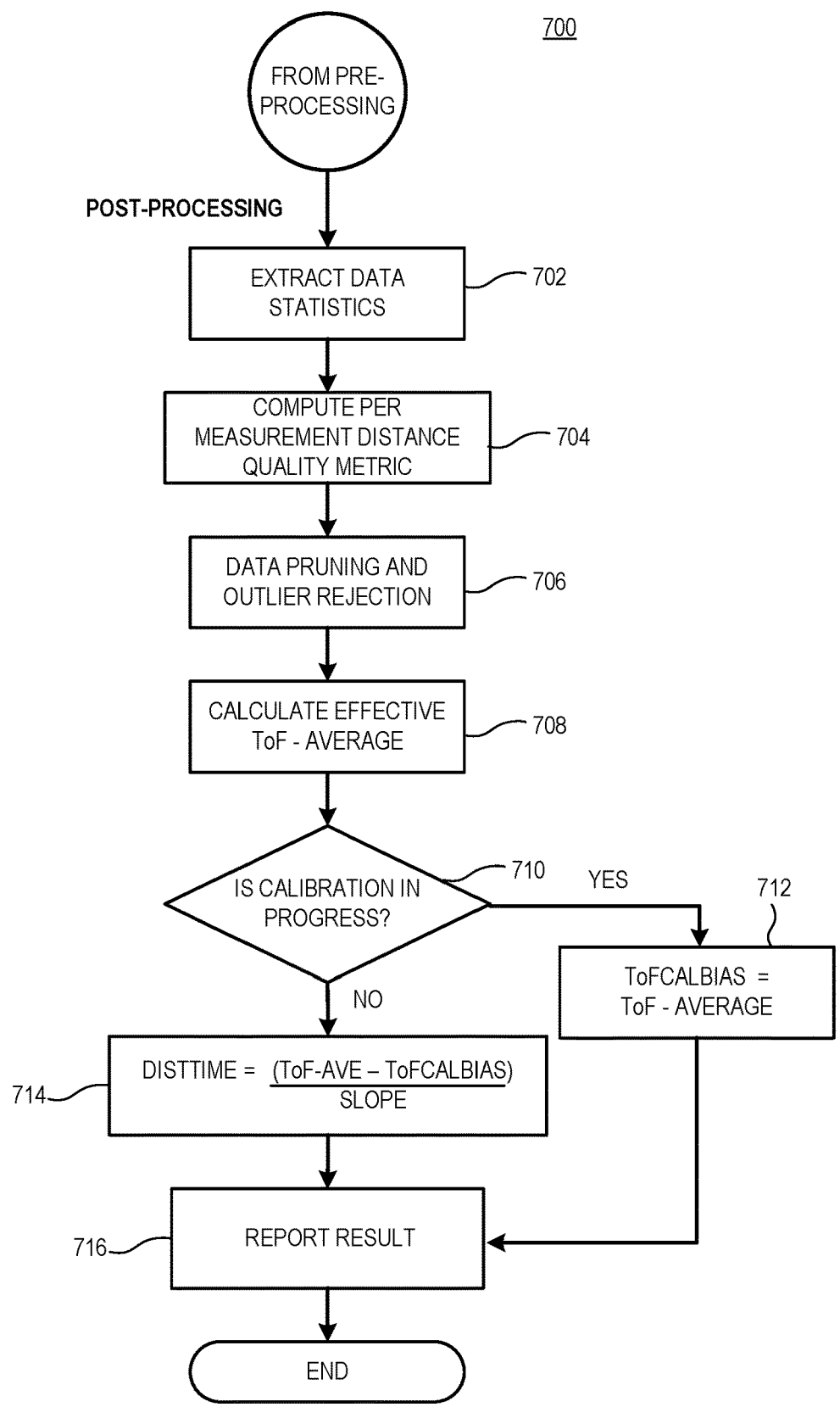
FIG. 7 is a flow diagram of a method of executing a post-processing stage and a reporting stage of a multi-stage wireless ranging protocol in accordance with at least one embodiment.

FIGS. 6 and 7 together illustrate a flow diagram of a method of implementing a multi-stage wireless ranging protocol in accordance with at least one embodiment. For purposes of description, FIGS. 6 and 7 are described with respect to an example implementation at the wireless ranging system 100 of FIG. 1. With respect to FIG. 6, a flow chart of a method 600 of data collection and pre-processing stages is illustrated in accordance with at least one embodiment. At block 602 a ToF measurement session is initiated based on a start condition such as a user request, expiration of a timer triggering a periodic measurement session, detection of a specified device state, and the like.

In response to initiation of the ToF measurement session, an initialization stage takes place at block 604. During the initialization stage, the measuring device 102 sends a packet to the reflector device 104 to indicate that a measurement session has been initiated. In addition, the measuring device 102 and the reflector device 104 share timing information to align the oscillators or clock signals for their respective radios and counters. Further, the measuring device 102 provides a pseudo-random frequency pattern to the reflector device 104, indicating the pattern of frequencies to be used during the data collection stage.

The method flow proceeds to the data collection stage at block 606, and the radio modules 105 and 106 are initialized to an initial frequency indicated by the frequency pattern shared at block 604. At block 608, the measuring device 102 and the reflector device 104 communicate ranging and response packets to share timestamp counts as described above with respect to, for example, FIGS. 2 and 3. In at least one embodiment, the measuring device 102 and the reflector device 104 also share automatic gain control information for their respective radio modules 105 and 106. At block 610, the measuring device 102 determines if a requested number of count samples have been collected. If not, the method returns to block 608. If the requested number of samples have been collected, the method flow moves to block 612 and the measuring device 102 determines if all the frequencies in the frequency pattern have been used. If not, the method flow returns to block 606 and the radio modules 105 and 106 are set to the next frequency indicated in the frequency pattern to collect the next set of count samples.

Once all the frequencies in the frequency pattern have been used, the method flow proceeds from block 612 to block 614 and the pre-processing stage begins. At block 614 the measuring device 102 extracts timestamp data for each raw count stored during the data collection stage. For example, in at least one embodiment the raw count data does not itself indicate counter overflows, such that the raw count does not, by itself, indicate a particular time. Accordingly, at block 614 the measuring device 102 combines the raw count data with counter overflow information to convert each raw count sample to a corresponding timestamp. Each timestamp is included in a corresponding timestamp set associated with the transmission of a ranging packet and receipt of a corresponding response packet.

At block 616 the measuring device 102 calculates, for each set of timestamps, the processing time and the total time as described above. At block 618, the measuring device 102 compensates for any AGC group delay and other artifacts. In at least one embodiment, AGC group delay compensation is a correction applied to the computed ToF value by subtracting a specific delay value from the timestamps based on the AGC gain setting recorded while receiving a packet. AGC group delay is caused by the non-ideal phase response of physical mixed-signal RF and analog receive front end circuitry. In some implementations, the receiver group delay could also be impacted by digital signal processing variability as a function of received input signal level. AGC group delay compensation value can be estimated by a characterization of the receiver path group delay using a calibrated distance between two nodes that is measured over the entire AGC dynamic range.

At block 620, the measuring device 102 calculates and stores a ToF value for the current set of timestamps. At block 622 the measuring device 102 determines if all ToF values have been calculated, as indicated by a comparison of a ToF sample counter with the product of the number of requested samples and the number of frequencies in the specified frequency pattern. If not, the method flow returns to block 614 and the measuring device 102 extracts the timestamps for the next timestamp set. If, at block 622, all ToF values have been calculated, the method flow proceeds to the post-processing stage, described below with respect to FIG. 7.

FIG. 7 illustrates a flow diagram of a method of 700 of implementing a post-processing stage and a reporting stage in accordance with at least one embodiment. At block 702, the measuring device 102 extracts data statistics from the ToF values calculated at block 620 of FIG. 6. Examples of data statistics that can be extracted include an average, median, mode, minimum, maximum, centroid, medoid, variance, or standard deviation of the ToF values, and the like, or a combination thereof. At block 704 the measuring device 102 identifies a quality metric for each ToF value based on the data statistics extracted at block 702. For example, in one embodiment the quality metric for each ToF value is the deviation of the ToF value from the extracted data statistic, such as a deviation from the average or other statistical measure of the ToF values.

At block 706, the measuring device 102 prunes the ToF values by discarding those values whose quality metric is below a threshold. At block 708 the measuring device 102 combines the pruned ToF values according to a specified formula, such as by averaging, to generate an initial effective ToF value. At block 710, the measuring device 102 determines if the wireless ranging system 100 is in a calibration mode. If so, the method flow moves to block 712 and the measuring device 102 sets a calibrated bias value, designated ToFCALBIAS, to the initial effective ToF value. The method flow proceeds to block 716 described below.

Returning to block 710, if the wireless ranging system 100 is not in a calibration mode, the method flow proceeds to block 714 and the measuring device 102 calculates a time value, designated DISTTIME, according to the following formula:

$$DISTTIME = \frac{ToFAVE - ToFCALBIAS}{SLOPE}$$

where the SLOPE is a propagation speed of the communicated packets. In at least one embodiment, the SLOPE value is a function of the average ToF value to allow for the compensation of RF propagation speed variability as a function of distance and the physical characteristics of the indoor/outdoor space where the distance estimation is taking place At block 716 the measuring device 102 reports the distance to software executing at the measuring device 102 or another device, and the executing software can employ the distance to take one or more specified actions as described above.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
generating, at a first device, a first plurality of counts, each of the first plurality of counts indicative of a transmit time of a corresponding packet;
generating a second plurality of counts, each of the second plurality of counts indicative of a receive time of a corresponding packet;
in response to a number of samples of the first plurality of counts exceeding a threshold,
generating a plurality of timestamps based on the first plurality of counts and the second plurality of counts;
generating a plurality of time-of-flight values based on the plurality of timestamps;
generating an effective time-of-flight value based on a combination of the plurality of the time-of-flight values;
identifying a distance between the first device and a second device based on the effective time-of-flight value; and
keeping a count of rollovers at a counter and employing the rollover count to extract the plurality of timestamps from raw counts provided by the counter.

2. The method of claim 1, wherein:
generating the first plurality of counts comprises:
generating a first portion of the first plurality of counts based on transmitting a first plurality of packets at a first frequency; and
generating a second portion of the first plurality of counts based on transmitting a second plurality of packets at a second frequency different from the first frequency.

3. The method of claim 2, further comprising:
transmitting a frequency pattern indicating the first frequency and the second frequency from the first device to the second device.

4. The method of claim 1, further comprising:
prior to generating the first plurality of counts and the second plurality of counts, synchronizing a first clock of the first device with a second clock of the second device, and wherein generating the first plurality of counts comprises generating the first plurality of counts based on the first clock.

5. The method of claim 1, wherein generating the effective time-of-flight value comprises:
generating a statistical profile based on the first plurality of counts and the second plurality of counts;
determining quality metrics for the plurality of time-of-flight values based on the statistical profile;
selecting a subset of the plurality of time-of-flight values based on the quality metrics; and
generating the effective time-of-flight value based on the selected subset of time-of-flight values.

6. The method of claim 1, wherein generating the first plurality of counts comprises:
generating each of the first plurality of counts by triggering a read of a counter of the first device in response to defined event at a radio of the first device.

7. The method of claim 1, wherein generating the effective time-of-flight value comprises:
adjusting at least one of the plurality of time-of-flight values based on an automatic gain control associated with one of the first device and the second device; and
generating the effective time-of-flight value based in part on the adjusted one of the plurality of time-of-flight values.

8. A method, comprising:
generating a statistical profile for a plurality of time-of-flight values, each of the plurality of time-of-flight values based on communication of associated packets between a first device and a second device;
pruning the plurality of time-of-flight values based on the statistical profile to generate a pruned set of time-of-flight values;

generating an effective time-of-flight value based on a combination of the pruned set of time-of-flight values;

identifying a distance between the first device and as second device based on the effective time-of-flight value; and keeping a count of rollovers at a counter and employing the rollover count to extract the plurality of timestamps from raw counts provided by the counter.

9. The method of claim 8, wherein generating the statistical profile comprises determining an average of the plurality of the time-of-flight values.

10. The method of claim 8, wherein generating the statistical profile comprises determining a median of the plurality of the time-of-flight values.

11. The method of claim 8, wherein pruning the plurality of time-of-flight values comprises:

generating a quality metric for each of the plurality of time-of-flight values based on the statistical profile; and pruning the plurality of time-of-flight values based on the generated quality metrics.

12. The method of claim 8, wherein generating the effective time-of-flight value comprises:

generating an initial time-of-flight value based on the combination of the plurality of the time-of-flight values; and generating the effective time-of-flight value based on a combination of the initial time-of-flight value and a calibration offset.

13. The method of claim 8, further comprising:

generating the plurality of time-of-flight values based on a plurality of counts corresponding to transmit times and receive times of a plurality of packets.

14. A device, comprising:

a radio configured to transmit and receive packets;

a counter configured to generate a first plurality of counts, each of the first plurality of counts indicative of a transmit time of a corresponding packet;

the counter further configured to generate a second plurality of counts, each of the second plurality of counts indicative of a receive time of a corresponding packet;

a processor configured to:

in response to a number of the first plurality of counts exceeding a threshold, generating a plurality of timestamps based on the first plurality of counts and the second plurality of counts;

generate a plurality of time-of-flight values based on the plurality of timestamps;

generate an effective time-of-flight value based on a combination of the plurality of the time-of-flight values;

identify a distance between the device and another device based on the effective time-of-flight value; and keep a count of rollovers at the counter and employ the rollover count to extract the plurality of timestamps from raw counts provided by the counter.

15. The device of claim 14, wherein the counter is configured to generate the first plurality of counts by:

generating a first portion of the first plurality of counts based on the radio transmitting a first plurality of packets at a first frequency; and generating a second portion of the first plurality of counts based on the radio transmitting a second plurality of packets at a second frequency different from the first frequency.

16. The device of claim 15, wherein the radio is configured to:

transmit a frequency pattern indicating the first frequency and the second frequency.

17. The device of claim 14, wherein the processor is configured to:

prior to the counter generating the first plurality of counts and the second plurality of counts, synchronize a first clock of the device with a clock of another device, and wherein generating the first plurality of counts comprises generating the first plurality of counts based on the first clock.

18. The device of claim 14, wherein the processor is configured to generate the effective time-of-flight value by:

generating a statistical profile based on the first plurality of counts and the second plurality of counts;

determining quality metrics for the plurality of time-of-flight values based on the statistical profile;

selecting a subset of the plurality of time-of-flight values based on the quality metrics; and generating the effective time-of-flight value based on the selected subset of time-of-flight values.

19. The device of claim 14, wherein the processor is configured to generate the effective time-of-flight value by:

generating an initial time-of-flight value based on the combination of the plurality of the time-of-flight values; and generating the effective time-of-flight value based on a combination of the initial time-of-flight value and a calibration offset.

20. The device of claim 14, wherein the processor is configured to generate the effective time-of-flight value by:

adjusting at least one of the plurality of time-of-flight values based on an automatic gain control; and generating the effective time-of-flight value based in part on the adjusted one of the plurality of time-of-flight values.

* * * * *